(12) United States Patent
Kreutzig

(10) Patent No.: US 8,226,251 B1
(45) Date of Patent: Jul. 24, 2012

(54) EYE CUP NIGHT FILTER ATTACHMENT AND MOUNTING DEVICE

(76) Inventor: Kirk Kreutzig, Naperville, IL (US)

( * ) Notice: Subject to any disclaimer, the term of this patent is extended or adjusted under 35 U.S.C. 154(b) by 790 days.

(21) Appl. No.: 12/143,499

(22) Filed: Jun. 20, 2008

Related U.S. Application Data

(63) Continuation-in-part of application No. 12/012,266, filed on Jan. 31, 2008, now abandoned.

(60) Provisional application No. 60/898,483, filed on Jan. 31, 2007, provisional application No. 60/898,484, filed on Jan. 31, 2007.

(51) Int. Cl.
*G02B 23/16* (2006.01)
*F41G 1/00* (2006.01)

(52) U.S. Cl. .......... 359/612; 359/809; 359/885; 42/129; 42/143

(58) Field of Classification Search .................. 359/399, 359/601, 611, 612, 809, 885, 892; 42/111–148; 362/110; 434/11–22
See application file for complete search history.

(56) References Cited

U.S. PATENT DOCUMENTS

| | | | |
|---|---|---|---|
| 3,571,649 A | 3/1971 | Bush, Jr. | |
| 3,588,215 A | 6/1971 | Singh | |
| 3,929,487 A | 12/1975 | Singh | |
| 4,202,601 A | 5/1980 | Burbo et al. | |
| 4,542,959 A | 9/1985 | Kreutzig | |
| 6,075,661 A | 6/2000 | Gross et al. | |
| 6,088,174 A * | 7/2000 | Cox | 359/819 |
| 6,158,865 A | 12/2000 | Kreutzig | |
| 6,614,606 B2 | 9/2003 | Jones | |
| 6,862,144 B1 | 3/2005 | Aguero et al. | |
| 2006/0218841 A1* | 10/2006 | Campean | 42/129 |
| 2007/0013800 A1* | 1/2007 | Pope | 348/333.01 |
| 2008/0013175 A1 | 1/2008 | Laganas et al. | |
| 2008/0186584 A1* | 8/2008 | Ballard | 359/611 |
| 2009/0231742 A1 | 9/2009 | Neff | |

OTHER PUBLICATIONS

"Multi-Flex Flip-Open Scope Covers" from Butler Creek Products website found at http://wvvw.butler-creek.com/products/scopes_multi_flex.html, Oct. 1, 2008.
"Flip-Open Scope Covers" from Butler Creek Products website found at http://www.butler-creek.com/products/scopes_flip_open.html, Oct. 1, 2008.

* cited by examiner

*Primary Examiner* — Darryl J Collins
(74) *Attorney, Agent, or Firm* — Hughes Socol Piers Resnick & Dym, Ltd.; Todd S. Parkhurst

(57) ABSTRACT

An eyecup and optical filter appliance is disclosed and claimed. The appliance can be attached to a vision aid device such as an active or passive night vision device, a telescopic sight for a weapon, or the like. The appliance includes a tubular body, an optical filter mounted within a tubular body end cap, and means for mounting the appliance to the vision-aid device. The tubular body includes a main body and an eyecup sized and shaped to mold closely to that portion of the users face surrounding his eye, so that light is not reflected from the user toward his opponent.

14 Claims, 6 Drawing Sheets

EYE CUP NIGHT FILTER ATTACHMENT AND MOUNTING DEVICE

CLAIMS OF PRIORITY

This application is a Continuation-in-Part application of co-pending U.S. utility patent application Ser. No. 12/012,266 filed Jan. 31, 2008. The '266 application claims domestic priority from U.S. provisional application Ser. No. 60/898,483 filed Jan. 31, 2007; and from U.S. provisional application Ser. No. 60/898,484 filed Jan. 31, 2007.

BACKGROUND OF THE INVENTION

This invention relates generally to Night Vision Devices, and more specifically to an eyecup and optical filter for attachment to a vision aid device. The invention comprises an appliance for placing an optical filter between a Night Vision Device and the device user's eye. Several embodiments of such devices are disclosed and claimed in co-pending U.S. utility patent application Ser. No. 12/012,266 filed Jan. 31, 2008, which is incorporated herein by reference.

It is well known (e.g. Duplicity Theory as discussed in Graham's (Editor) *Vision and Visual Perception* (John Wiley and Sons, 1966)) that the human eye has two modes of function depending on the incident illumination levels. In this regard, the term "photopic" refers to the eye function at a relatively high level of illumination (daylight) and "scotopic" refers to function at relatively low light levels (night). Acuity and color sensitivity are significantly better for the photopic regime; sensitivity to low illumination is significantly better with scotopic vision.

An important fact is the time period required to transition from photopic to scotopic vision, a phenomenon termed dark adaptation time. Depending on prior conditions, this dark adaptation time can be 45 minutes or longer. During this transition, the eye and the associated vision system have difficulty forming images resulting in a condition called night blindness.

Night Vision Devices (NVDs) refer to a group of electronic devices used to augment the vision of the user in low light and/or dark conditions. There are at least four classes of such devices distinguished by the type of illumination amplified by their respective electronics. They are sometimes referred to as passive image intensifiers, infrared imaging devices, thermal imaging devices, and combinations of these called fusion devices. Other types of devices may include infrared sources to illuminate the scene.

These NVDs utilize a display to convert the electronic signals from the detectors into an image visible by the human eye. It is a well-known fact that such displays are sufficiently bright to cause the eye to function in the photopic regime or the intermediate regime between photopic and scotopic. Therefore when the user of the NVD removes the device or looks away from the display, he endures night blindness during the dark adaptation time.

Special filters such as that disclosed in U.S. Pat. No. 6,158,865, incorporated herein by reference, have been designed to shorten the dark adaptation time and reduce this night blindness. Other filters have been used to improve visual acuity.

The displays of the NVDs can also produce a general illumination of the user's face and/or eye socket. Often referred to as "signature" or "splash", this is very undesirable because it will disclose the presence and location of the NVD user to hostile persons who happen to be looking in the direction of the NVD user.

Some previous designs have placed filters in the optical train of the NVD eyepiece objective before the final optic. This is undesirable because it alters the focal properties of the NVD eyepiece objective.

OBJECTIVES AND SUMMARY OF THE INVENTION

It is the object of this invention to locate optical filters in Night Vision Device appliances in predetermined positions which significantly improve the ease and safety of use of the filtered NVD without degradation of the NVD performance.

It is a more specific object of the invention to provide an appliance having an eyecup which fits snugly against the area surrounding a user's eye to reduce or eliminate signature or splash; and which securely mounts an optical filter; and which can be easily attached to a vision aid device such as a Night Vision Device and/or weapon sight.

A related object of the invention is to provide an appliance which can be easily, securely and quickly attached to a weapon sight or vision aid device, and in which a dust cap and the optical filter itself can be easily and quickly moved from use positions to positions conveniently out of the way of the user.

DETAILED DESCRIPTION

Figure 1:
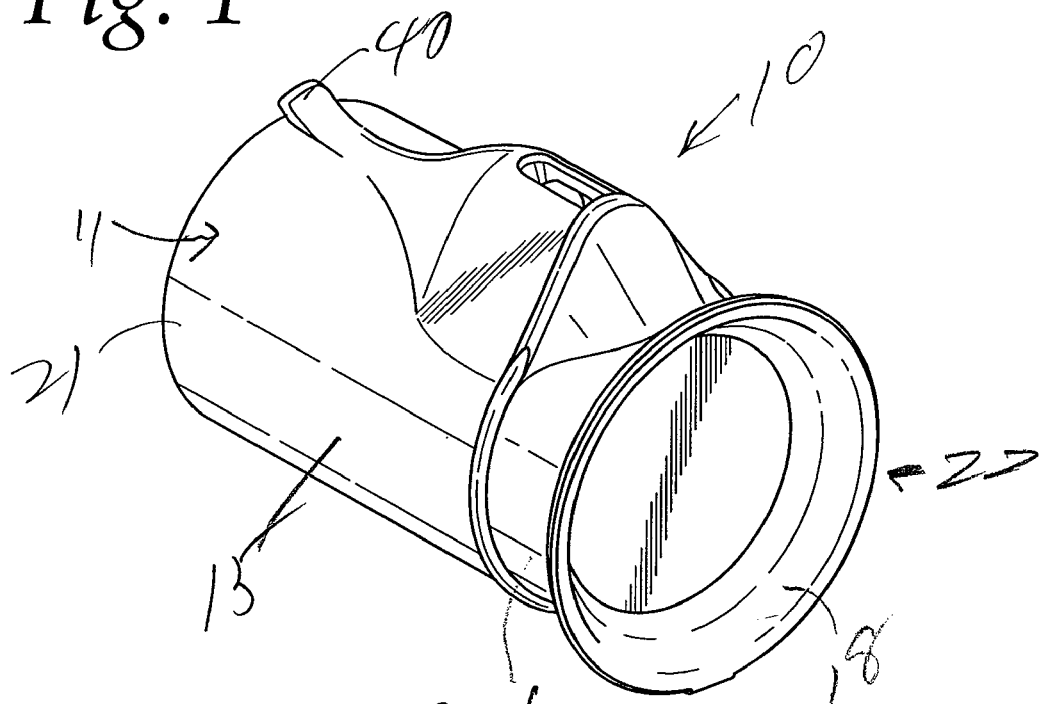
FIG. 1 is an isometric view of the novel appliance.
Figure 2:
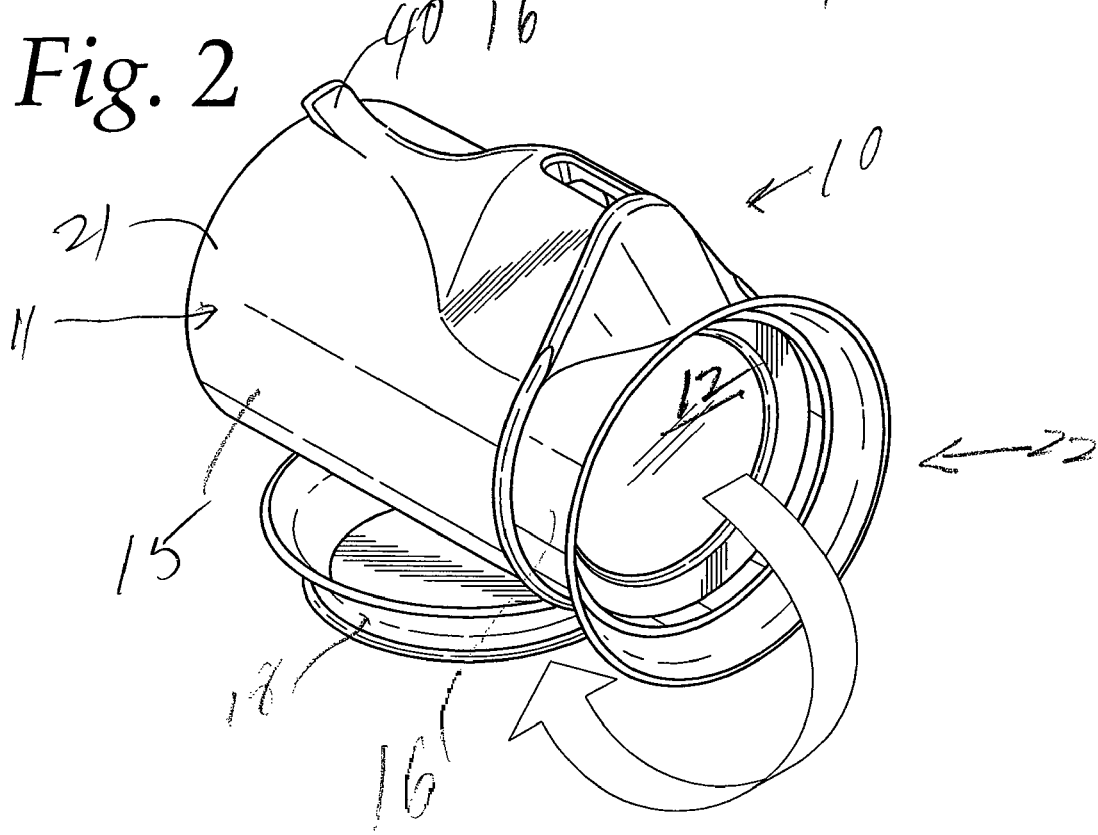
FIG. 2 is an inverted isometric view of the appliance shown in FIG. 1, but showing how an end cap can be moved from a mounted position to an out-of-the-way position.
Figure 3:
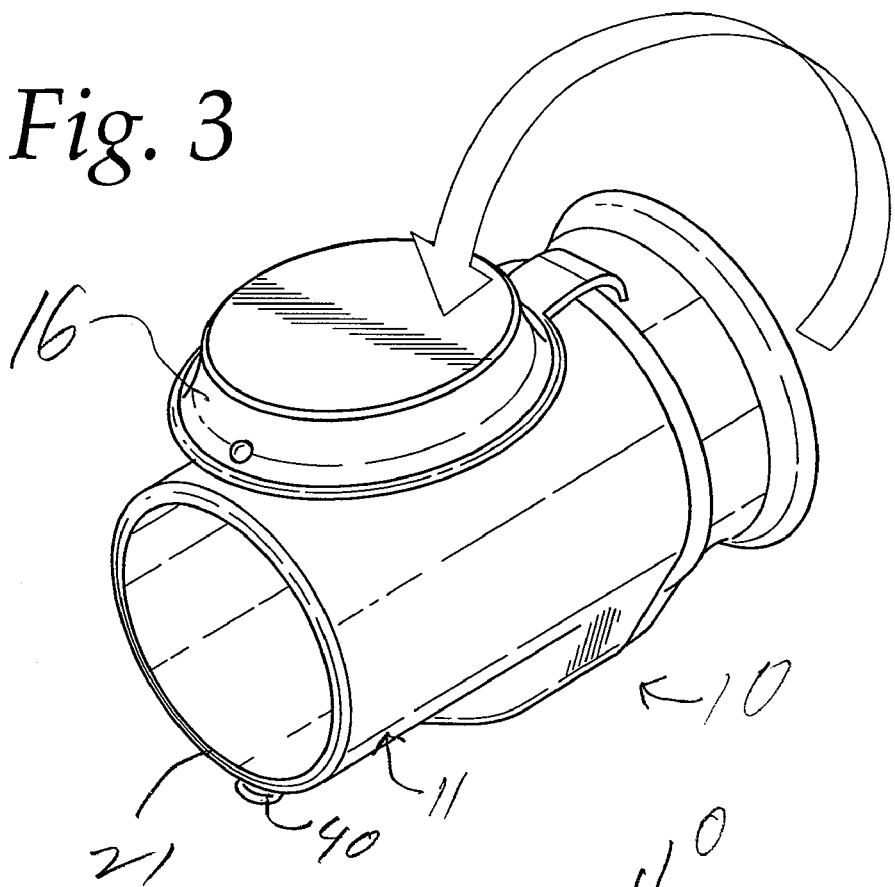
FIG. 3 is an inverted isometric view of the appliance shown in FIGS. 1 and 2 showing the end cap moved from its mounted position to its out-of-the-way position.
Figure 4:
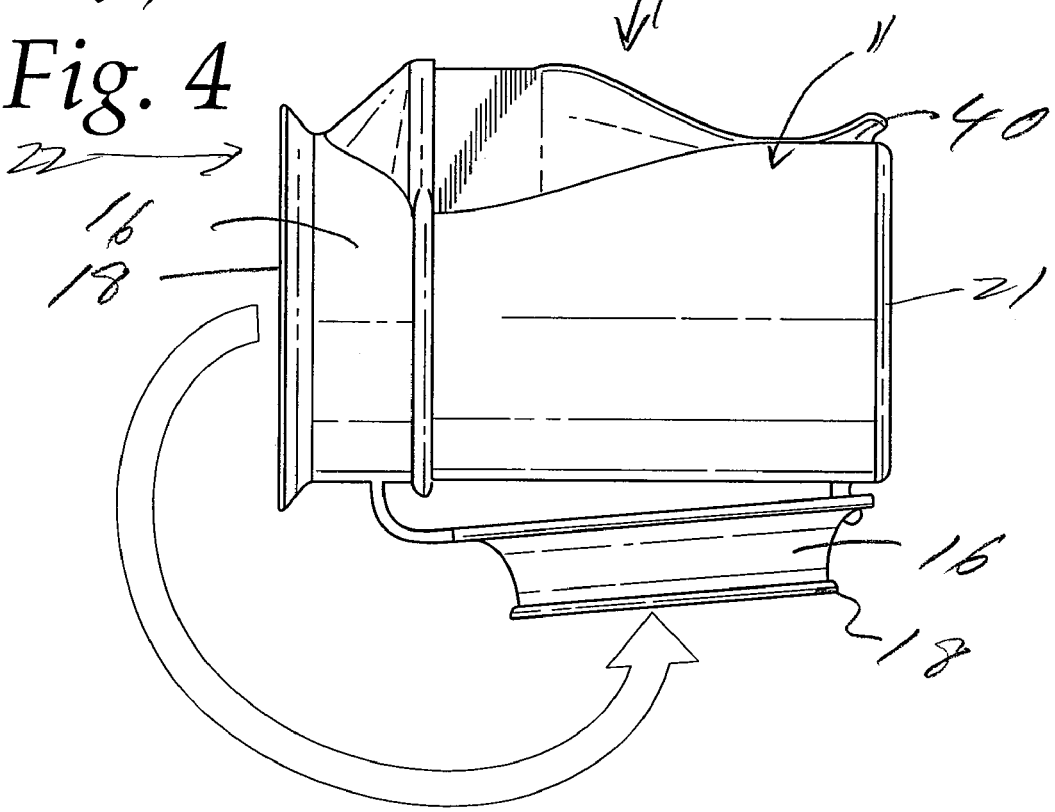
FIG. 4 is a side elevational view of the appliance showing how the end cap can be moved from a mounted position to an out-of-the-way position.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

An exemplary embodiment of the novel appliance 10 is shown in the drawings. The appliance 10 comprises a bi-ended tubular body 11, and an optical filter 12. The tube has opposite ends 21 and 22. The tubular body 11 is comprised of a main tube 15 and an end cap 16 within which is mounted the optical filter 12. A dust cover 18 selectively covers the optical filter 12 mounted within the end cap 16 of a first tube end 21.

Figure 8:
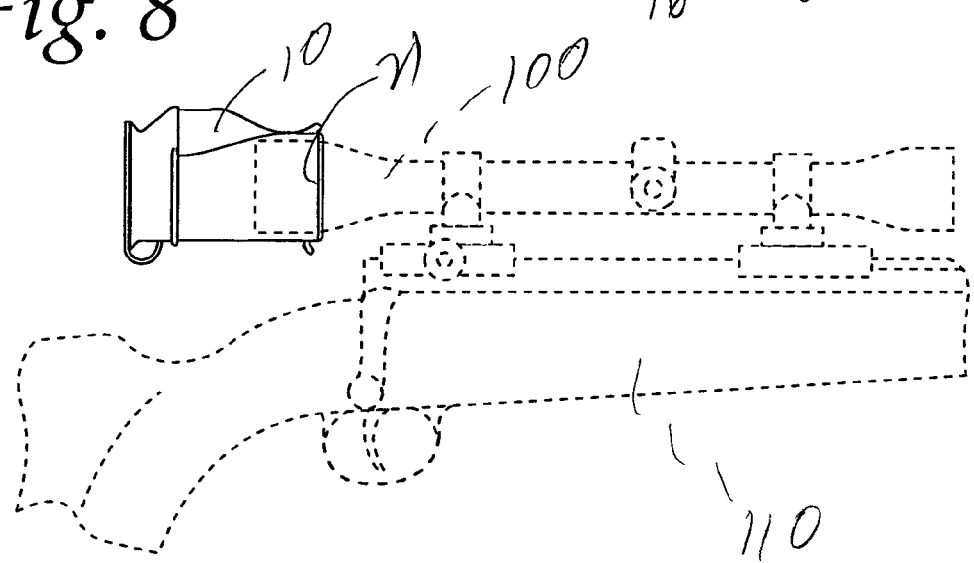
FIG. 8 is a side elevational view of the appliance as it appears when mounted to an optical sight of a weapon.

The tube main body 15 is sized and shaped to fit, as by an interference fit, to a muting portion of a telescopic sight or other vision aid device 100 (FIG. 8).

In the illustrated embodiment, all the appliance parts except for the optical filter itself are made of a suitable flexible rubber-like material. This material can be a 90 A durometer polychloroprene such as one of the neoprene polymers offered by E. I. du Pont de Nemours and Company of Wilmington, Del. This sight or vision aid device 100 can be a night vision enhancing device, or it can be an active or passive telescopic sight device. Of whatever nature, this sight or vision aid device can be mounted upon a weapon 110 as suggested especially in FIG. 8.

Figure 5:
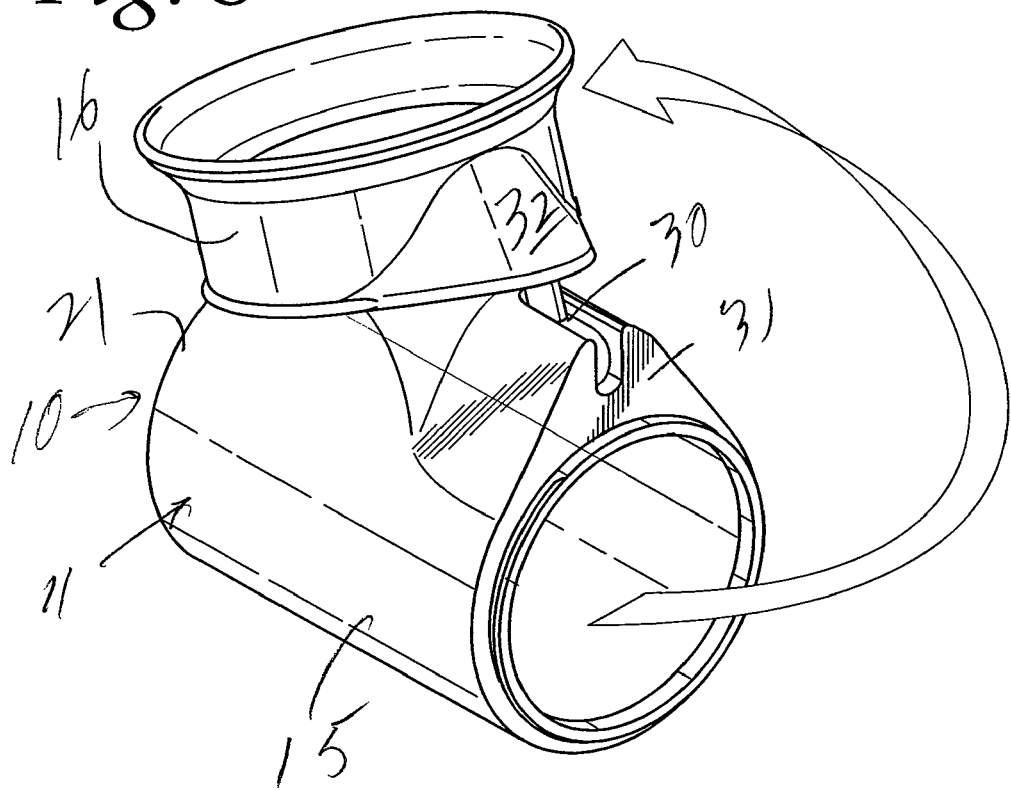
FIG. 5 is an isometric view similar to FIG. 1, but showing how the appliance end cap and mounted optical filter can be moved from a use position to an out of-of-the-way storage position atop the appliance main tube.
Figure 6:
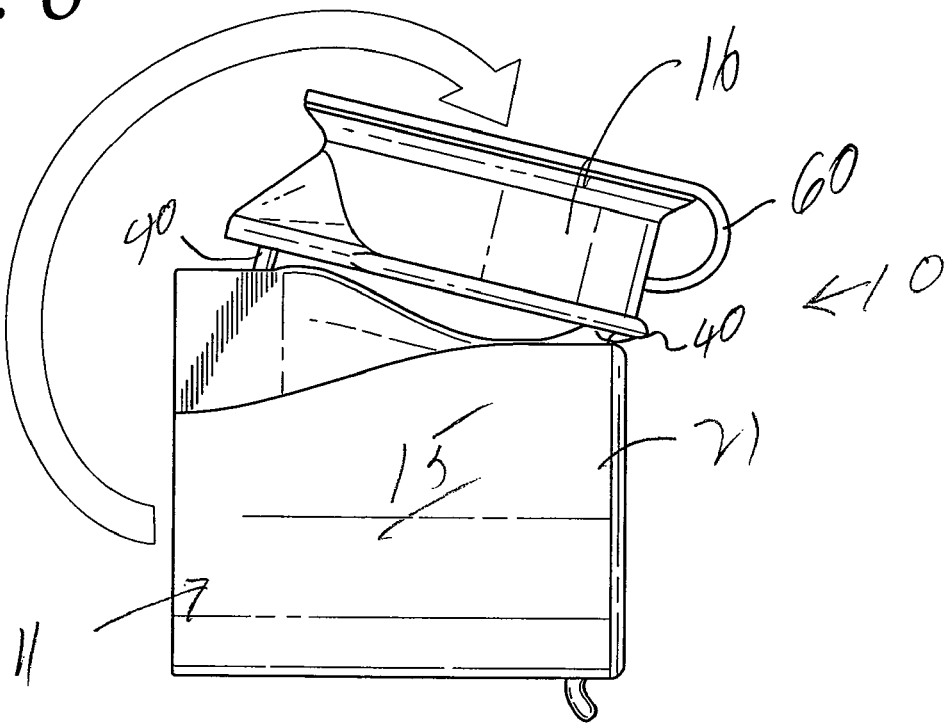
FIG. 6 is a side elevational view showing how the appliance end cap and optical filter can be moved from a use position to an out of-of-the-way storage position atop the appliance main tube.
Figure 7:
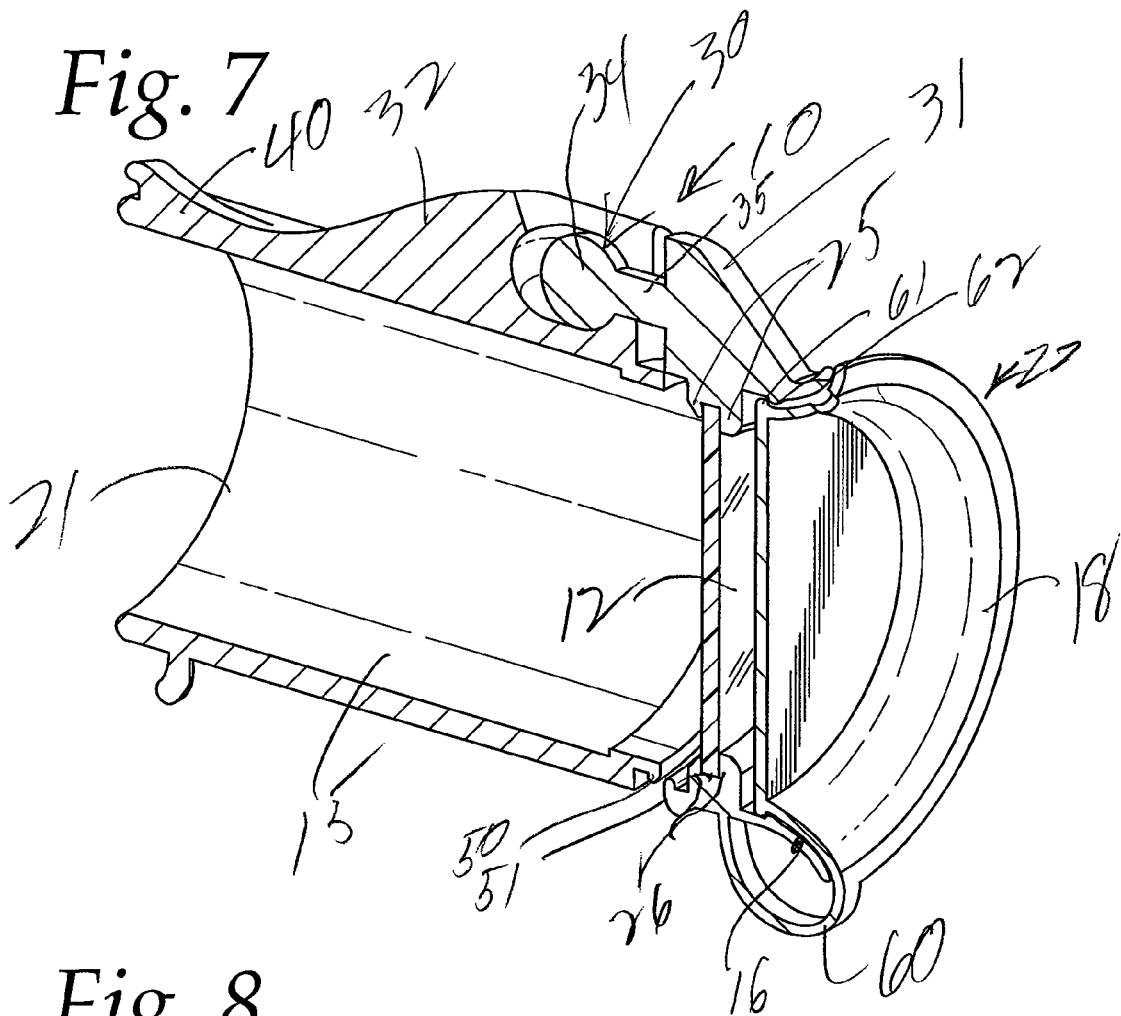
FIG. 7 is an isometric cross-sectional view of the appliance.

At the other end 22 of the main appliance tube 15 is mounted the end cap 16. In carrying out the invention, the optical filter 12 is mounted within the end cap 16 by appropriately shaped rings 25 and grooves 26 as suggested in FIG. 7. This filler 12 can have the optical characteristics described in U.S. Pat. No. 6,158,865, which is incorporated herein by reference, or it can have other optical characteristics. The end cap 16 is mounted to the main tube 15 by a ball and socket arrangement 30 provided on confronting embossments formed on the end cap 16 and main tubular body 15, as shown in FIG. 7. This ball and socket hinge arrangement 30 can be formed of a neoprene polymer identical to that which forms the other elements of the novel appliance. The ball 34 and socket neck 35 are flexible, as also suggested in FIG. 7. This flexible hinge arrangement 30 permits the end cap and the carried optical filter 12 to be swung up into an out-of-the-way position as suggested in FIGS. 5 and 6 so that the user can quickly 120 reconfigure the novel appliance for use in either daylight or dark operating conditions. To accomplish this reconfiguration, the user simply pulls the end cap 16 away from the main tube 15, pivots the end cap 16 through 180° around the hinge stem 35, and pushes the cap away from him so as to engage a portion of the end cap 16 with a catch 40, as suggested in FIGS. 5, 6 and 7. But when the end cap 16 and its mounted optical filter 12 are located in their respective in-use positions as shown in FIGS. 1, 2, 7 and 8, the end cap 16 is secured to the main body 15 by inter-engaging ridges and recesses 50, 51 (FIG. 7).

In accordance with the invention, the end cap 16 is formed of pliable material and is sized and shaped to fit and mold closely to that portion of the user's face surrounding his eye, so that light is not reflected from the user toward his opponent. The end cap should be pliable and can have a corrugated shape to accommodate and absorb weapon recoil when the appliance and weapon are in use.

Figure 9:
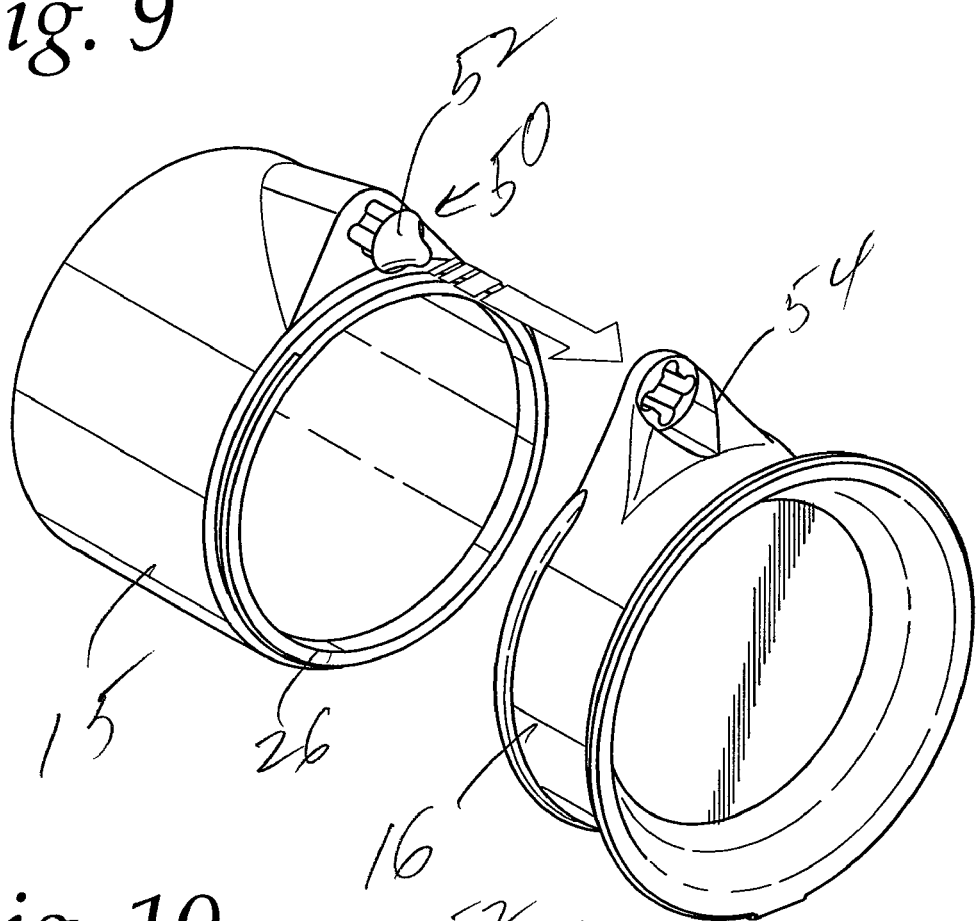
FIG. 9 is an isometric view of a modified embodiment of the appliance, suggesting how the appliance end cap can be removed from the appliance main tube.
Figure 10:
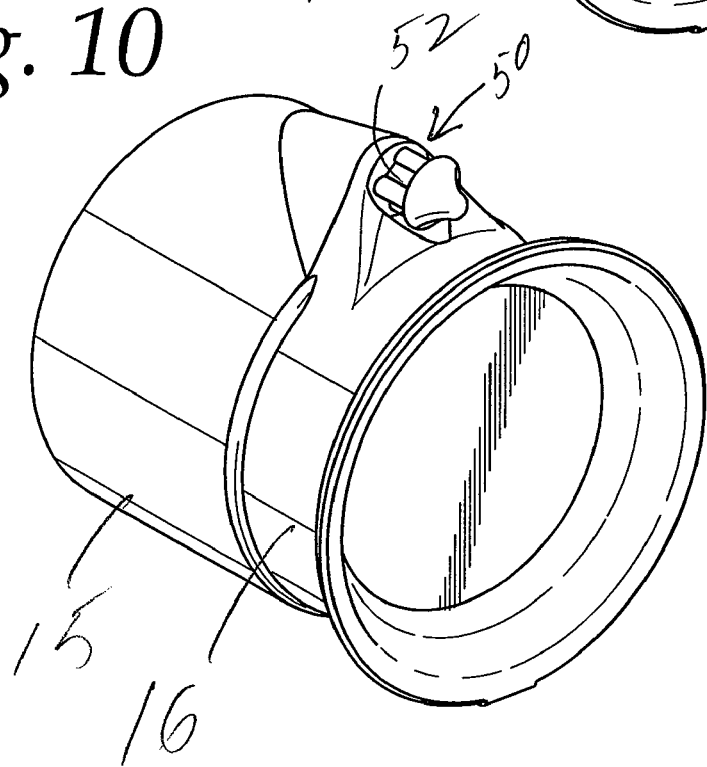
FIG. 10 is an isometric view similar to FIG. 9 but showing the end cap mounted upon the appliance main tube.
Figure 11:
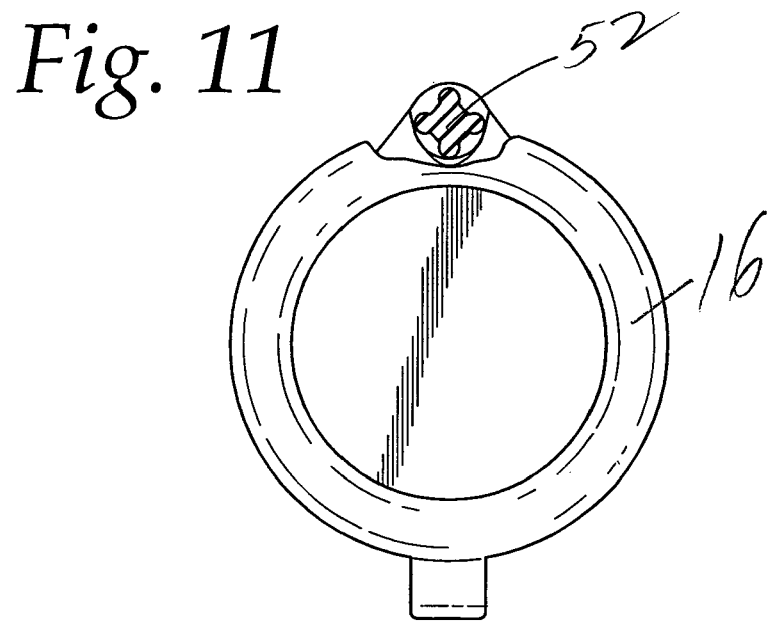
FIG. 11 is an elevational view in partial section showing the appliance with an optical filter mounted therein.
Figure 12:
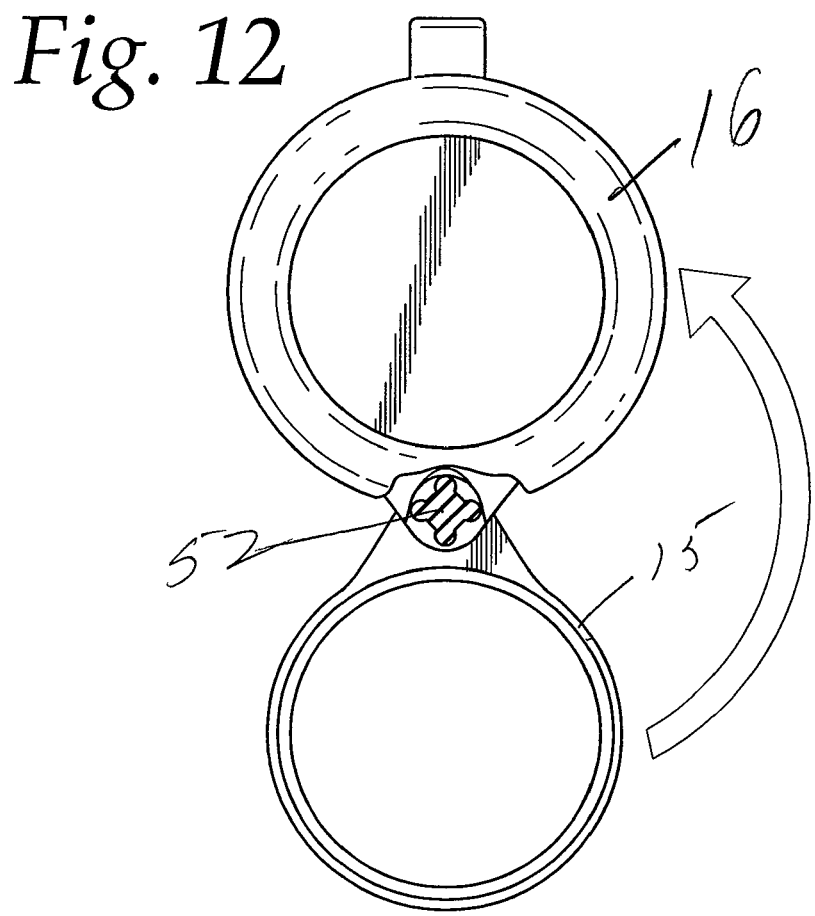
FIG. 12 as an elevational end view similar to FIG. 11, but inverted and showing the appliance end cap in a swung-away, out-of-the-way position.

A modified hinge arrangement 50 is illustrated in FIGS. 9, 10, 11 and 12. Here, a pivot stem 52 is provided. If desired, the stem 52 and its head can be arranged so that the end cap 16 can be entirely detached from the main body 15. Suitably apertured embossments 54 can be provided on the end cap 16 as shown in FIG. 9.

In accordance with another yet another aspect of the invention, a dust cover 18 can be fit over the end cap 16. The dust cover 18 is attached to the end cap 16 by a tether strap 60 which can be formed of the same material as the dust cover 18 and end cap 16, as shown in FIGS. 6 and 7. To make use of the dust cover easy, this tether is located at a position substantially 180° around the main tube 15 from the end cap hinge arrangement 30. Inter-engageable annular ridges and recesses attach the dust cover 18 to the end cap 16 when the end cap 16 is located in the closed position as suggested in FIGS. 1, 7 and elsewhere.

The invention claimed is:

1. An eyecup and optical filter appliance for attachment to a night vision aid device, the appliance comprising, in combination:
    a tubular body including a bi-ended main tube adapted, at one end, to be attached to the vision aid device;
    an end cap adapted to be attached to the main tube at the other tube end;
    an optical filter mounted within the end cap;
    a flexible attachment mechanism extending between the main tube and the end cap at a first location on the main tube and the end cap;
    a dust cap adapted to be attached to the end cap; and
    a flexible attachment mechanism extending between the end cap and the dust cap at a second location on the end cap, the second location being disposed substantially diametrically opposite the first location.

2. An appliance according to claim 1 wherein said main tube includes means for mounting the appliance to the vision aid device, and the end cap includes means for mounting the optical filter within the end cap.

3. An appliance according to claim 1 wherein said hinge mechanism includes at least one flexible element connected between the end cap and the main tube.

4. And appliance according to claim 1 wherein said end cap and said main tube are provided with inter-engageable annular ridges and recesses for attaching the end cap to the main tube.

5. An appliance according to claim 1 further including a rotatable arm means and a hinge mechanism attaching the end cap to the main tube, wherein said rotatable arm means and said hinge mechanism each include at least one flexible member made of material substantially similar to the material from which the end cap and the main tube are made.

6. An appliance according to claim 1 further including a dust cover member tethered to the end cap.

7. An appliance according to claim 6 wherein said appliance includes a tether member extending between the end cap and the dust cover member wherein the tether member is made of material substantially similar to the material from which the and cap and the dust cover are made.

8. An appliance according to claim 6 wherein said end cap and said dust cover are provided with inter-engageable annular ridges and recesses for attaching the dust cover to the end cap.

9. An appliance according to claim 1 wherein said optical filter is mounted within said end cap of the tubular body.

10. An appliance according to claim 1 wherein said main tube is adapted to be fitted to a predetermined portion of the vision aid device with interference fit.

11. An eyecup and optical filter appliance and a vision aid device according to claim 1, wherein the vision aid device is a night vision enhancing device.

12. An eyecup and optical filter appliance and a vision aid device according to claim 1, wherein the night vision enhancing device is a passive device.

13. An eyecup and optical filter appliance and a vision aid device according to claim 11, wherein the night vision enhancing device is an active device.

14. An eyecup and optical filter appliance and a vision aid device according to claim 11, wherein the night vision enhancing device is a telescopic sight device adapted to be mounted to a weapon.

\* \* \* \* \*